(12) United States Patent
Coniglio et al.

(10) Patent No.: US 9,615,553 B2
(45) Date of Patent: Apr. 11, 2017

(54) ARTIFICIAL FISHING LURE

(71) Applicant: Dominion Lures, Inc., Mission Viejo, CA (US)

(72) Inventors: George Coniglio, Mission Viejo, CA (US); Marc Estrada, Mission Viejo, CA (US)

(73) Assignee: Dominion Lures, Inc., Mission Viejo, CA (US)

( * ) Notice: Subject to any disclaimer, the term of this patent is extended or adjusted under 35 U.S.C. 154(b) by 297 days.

(21) Appl. No.: 14/451,285

(22) Filed: Aug. 4, 2014

(65) Prior Publication Data

US 2015/0208628 A1  Jul. 30, 2015

Related U.S. Application Data

(63) Continuation-in-part of application No. 14/244,699, filed on Apr. 3, 2014, which is a continuation-in-part of application No. 14/166,742, filed on Jan. 28, 2014, now Pat. No. 9,179,656.

(51) Int. Cl.
*A01K 85/16* (2006.01)
*A01K 85/00* (2006.01)

(52) U.S. Cl.
CPC .............. *A01K 85/16* (2013.01); *A01K 85/00* (2013.01)

(58) Field of Classification Search
CPC ........ A01K 85/00; A01K 85/18; A01K 85/16; A01K 83/00; A01K 91/04
See application file for complete search history.

(56) References Cited

U.S. PATENT DOCUMENTS

| | | | | |
|---|---|---|---|---|
| 843,256 A * | 2/1907 | Bowersox | ............... | A01K 85/10 43/42.14 |
| 1,101,223 A * | 6/1914 | Welles | ................... | A01K 85/16 43/42.47 |
| 1,177,281 A * | 3/1916 | Schweickert | .......... | A01K 85/16 43/42.05 |
| 1,188,583 A * | 6/1916 | Townsend | .............. | A01K 85/16 43/42.16 |

(Continued)

FOREIGN PATENT DOCUMENTS

GB     793370 A *  4/1958  ............. A01K 85/16

*Primary Examiner* — Kathleen Alker
(74) *Attorney, Agent, or Firm* — K. David Crockett, Esq.; Paul J. Backofen, Esq.; Crockett & Crockett, PC

(57) ABSTRACT

A multi-segmented, soft-bodied, artificial fishing lure or swim bait with a natural profile includes plastic control planes in each body segment to generate a lure that is stable in the water, and demonstrates realistic swimming motions in a range of retrieve speeds and even when allowed to sink. At least one clear, stiff plastic control plane is inserted in each body segment to generate a lifelike swimming motion when the lure is retrieved. Each control plane may be moved within a range of positions to provide realistic motions for specific fishing techniques. The control planes inserted into and sometimes through the lure body are invisible in the water and are adjustable to accommodate a range of water conditions, densities and temperatures. The placement of control planes create the ability to limit unnatural/undesirable movements and expand or accentuate natural and desirable movements in each segment of the body of the lure.

8 Claims, 7 Drawing Sheets

(56) References Cited

U.S. PATENT DOCUMENTS

| | | | | |
|---|---|---|---|---|
| 1,582,713 A * | 4/1926 | Welch | A01K 85/18 | 43/42.05 |
| 1,737,683 A * | 12/1929 | Readman | A01K 85/12 | 43/42.32 |
| 2,539,234 A * | 1/1951 | Dobkowski | A01K 91/04 | 24/136 R |
| 2,557,516 A * | 6/1951 | Schipper | A01K 85/16 | 43/42.22 |
| 4,214,396 A * | 7/1980 | Firmin | A01K 85/16 | 43/42.1 |
| 4,653,212 A * | 3/1987 | Pixton | A01K 85/00 | 43/4.5 |
| 4,785,569 A * | 11/1988 | Thomas, Jr. | A01K 85/00 | 43/42.22 |
| 5,142,811 A * | 9/1992 | Freeman | A01K 85/00 | 43/42.06 |
| 5,661,921 A * | 9/1997 | Mason | A01K 85/16 | 43/42.06 |
| 5,926,993 A * | 7/1999 | Marusak | A01K 85/00 | 43/42.09 |
| 8,689,479 B1 * | 4/2014 | Smith | A01K 85/02 | 43/37 |
| 8,904,700 B1 * | 12/2014 | Kacines | A01K 85/00 | 43/17.2 |
| 2007/0175083 A1 * | 8/2007 | Wilson | A01K 85/02 | 43/42.15 |
| 2009/0307959 A1 * | 12/2009 | Hughes | A01K 85/18 | 43/42.15 |
| 2011/0010983 A1 * | 1/2011 | Briccetti | A01K 85/00 | 43/17.6 |
| 2015/0289491 A1 * | 10/2015 | Mancini | A01K 85/01 | 43/17.6 |

* cited by examiner

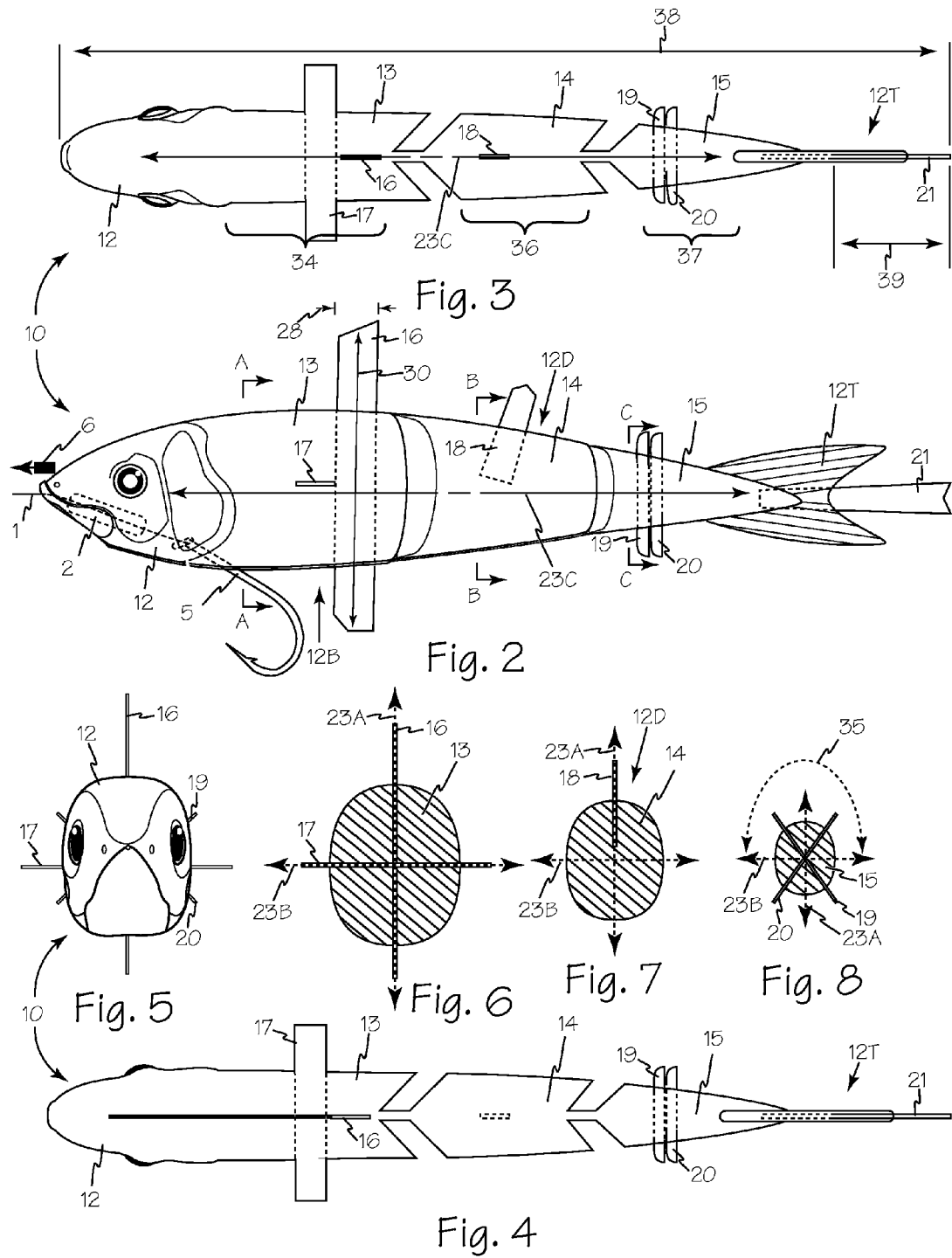

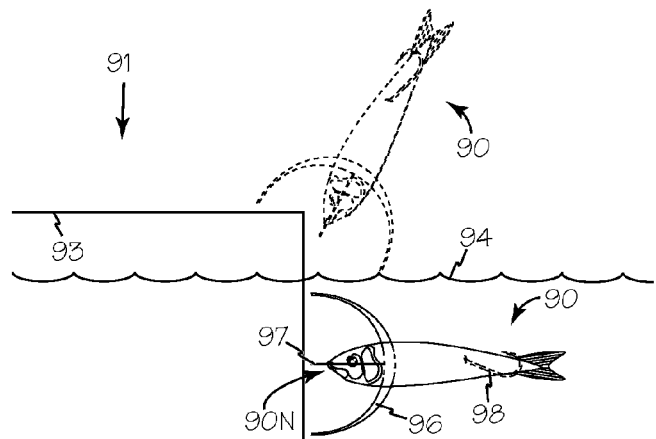
Fig. 19
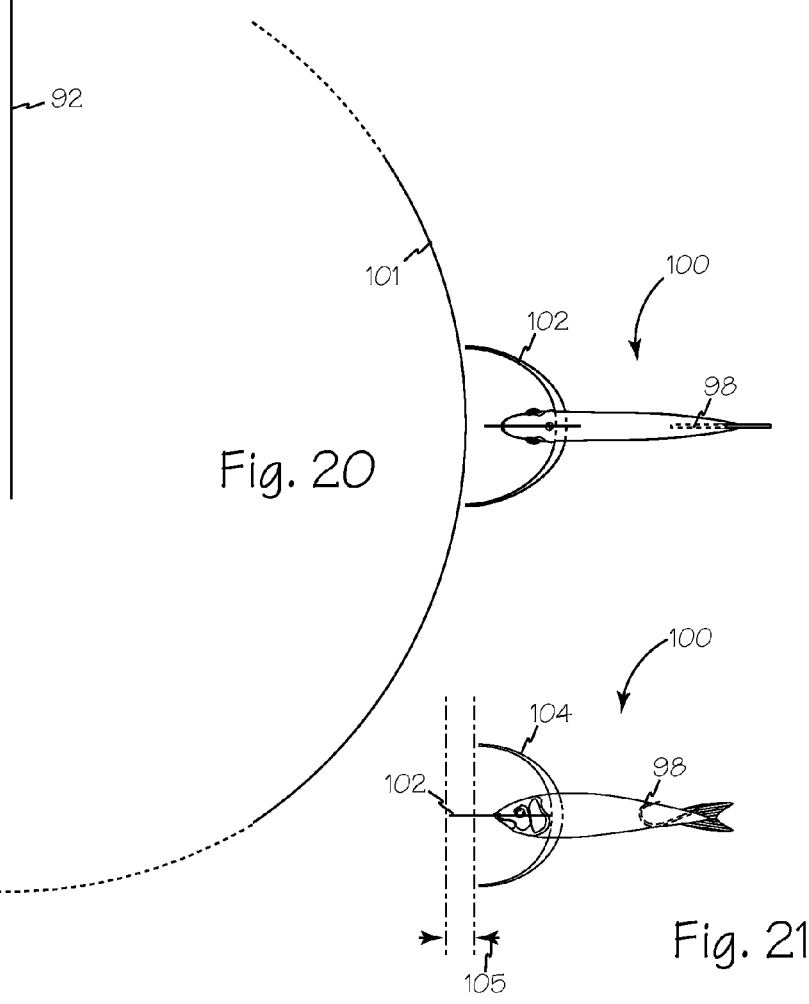
Fig. 20
Fig. 21

ARTIFICIAL FISHING LURE

RELATED APPLICATIONS

This application is a continuation-in-part of copending U.S. Utility application Ser. No. 14/244,699 filed Apr. 3, 2014 which is a continuation-in-part of copending U.S. Utility application Ser. No. 14/166,742 filed Jan. 28, 2014.

FIELD OF THE INVENTIONS

The inventions described below relate to the field of fishing lures and more specifically to realistic fishing lures that accurately simulate live, healthy, feeding baitfish.

BACKGROUND OF THE INVENTIONS

Artificial fishing lures such as swim baits attempt to simulate baitfish and to stimulate a strike response from gamefish. The swim bait has become extremely popular with game fisherman. These devices attempt to emulate the look and motion of smaller swimming fish and other creatures, attracting larger game fish to the hook and capture. Swim baits often closely resemble a shad, minnow, bluegill or any fish in size, shape, and color. The body is segmented in sections to allow it to move back and forth through the water.

Conventional soft plastic swim baits do not perform natural swimming or feeding motions on their own when compared to the live bait fish the lures are simulating. The problems with conventional swim baits are: 1) an unnatural lateral, side to side head wobble producing a wide lateral arc in the front of the lure, this motion is more of a snake like action than of a natural baitfish; 2) an exaggerated head wobble produces the same snakelike, exaggerated, lateral, side to side, wide lateral arc in the tail, similar to what is seen in the head; 3) the swim bait rolls with a longer/wider unnatural rocking about the longitudinal axis, a natural baitfish swims with a slight body roll; 4) the swim bait is unstable during faster retrieves or trolls spinning and rotating about both longitudinal and vertical axis' due to the exaggerated head arc, tail arc and body roll; 5) the swim bait does not swim down or dive downward naturally or glide with an upright orientation. In most cases, when the retrieve or troll is stopped, a conventional swim bait's tail does not beat or move as the bait sinks down toward the bottom, instead, the swim bait just tumbles and sinks.

Many conventional swim bait lures modify the natural, organic look of baitfish to provide twist, curl, paddle, or vortex tails and other visible non-lifelike extensions to generate motion in the lure or to simulate organic fish fins. Often the generated motion of these extensions generate erratic and unnatural motions and they do not look real. In addition, there is some variation in the weight and balance of conventional lures leading to inconsistent performance between two swim baits from the same package.

The fins and shape of living fish enable them to move through the water and feed with very little gross motion as is generated when retrieving many conventional lures. In addition, living baitfish are generally stable in the water and maintain an upright orientation when moving slowly through the water which is very different from many conventional lures that lean and bob in unnatural orientations when they are not being actively retrieved or allowed to sink or rest on the bottom.

SUMMARY

The devices and methods described below provide for an artificial fishing lure or swim bait with a natural profile that is stable in the water, and demonstrates realistic motions in a range of retrieve speeds and even when allowed to sink or work along the bottom. For weighted and unweighted lures, a multi-segment body is configured with a first segment much longer than any other segment and the length of the first segment approaches the same length as the combined length of all other segments. When the artificial lure is used without a weight, the fishing line is passed through a minimal weight plastic tube which is inserted in the lure body. After passing through the tube or a suitable weight, the fishing line is attached to a hook and the eye of the hook is secured to the lure body with a breakable or separable rib which passes through or is attached to both sides of the lure body.

For a weighted lure to mimic the feeding motion of a baitfish, at least one pair of clear, stiff extended control planes are inserted in the lure body keeping the center of mass of the artificial lure between the insertion points of the extended control planes and one or more weights inserted in the lure body. This configuration generates a lifelike feeding motion when the lure is dropped or worked on pilings, docks, trees, walls and over spawning beds. Each extended control plane may be moved within a range of positions to provide more precise motions for specific fishing techniques.

The control planes and extended control planes that are inserted into and sometimes through the lure body are nearly invisible in the water and are adjustable to accommodate a range of water conditions, densities and temperatures. The stiffness of the control planes and extended control planes also provides a very lifelike mouthfeel to a gamefish that strikes the lure which simulates the stiff spines of a baitfish which extend out when threatened or consumed. The strategic placement of control planes and extended control planes create the ability to limit unnatural/undesirable movements and expand or accentuate natural and desirable movements to specific segments of the body of the swim bait. Adjusting and controlling the forces applied to each body segment and therefore the motion of each body segment enables fine tuning adjustment of the gross motion of a swim bait lure and a feeding bait lure.

The control plane configuration disclosed here provides similar performance in a variety of fish body geometries from the torpedo shape of shad and minnows to the upright planar shape of crappie and bluegill. Control planes may be formed of any suitable clear, generally stiff material such as plastics, polymers and even ceramics such as glass.

The control planes in a multi-segment swim bait allow an angler to alter the way the swim bait moves through the water expanding the range of potential swimming motions/actions without changing the appearance of the lure because the alterations are made by adjusting the low visibility, clear plastic control planes. The forces generated by the control planes damp out unwanted motions and accentuate desired motions to more accurately simulate the motions of a live and swimming baitfish. The ability to adjust one or more control planes on each lure enables multiple lures to be adjusted to perform consistently if that is desired.

BRIEF DESCRIPTION OF THE DRAWINGS

FIG. 2 is a side view of a multi-segment soft-bodied fishing lure illustrating the control planes and weight and hook.

FIG. 3 is a top view of the fishing lure of FIG. 2.

FIG. 4 is a bottom view of the fishing lure of FIG. 2.

FIG. 5 is a front view of the fishing lure of FIG. 2.

FIG. 6 is a cross section view of the first segment of the fishing lure of FIG. 2 taken along A-A.

FIG. 7 is a cross section view of the second segment of the fishing lure of FIG. 2 taken along B-B.

FIG. 8 is a cross section view of the tail segment of the fishing lure of FIG. 2 taken along C-C.

FIG. 19 is a side view of a feeding baitfish lure with extended control planes facing a vertical structure.

FIG. 20 is a top view of a feeding baitfish lure with extended control planes facing a round structure.

FIG. 21 is a side view of the feeding baitfish lure of FIG. 20.

DETAILED DESCRIPTION OF THE INVENTIONS

Figure 1:
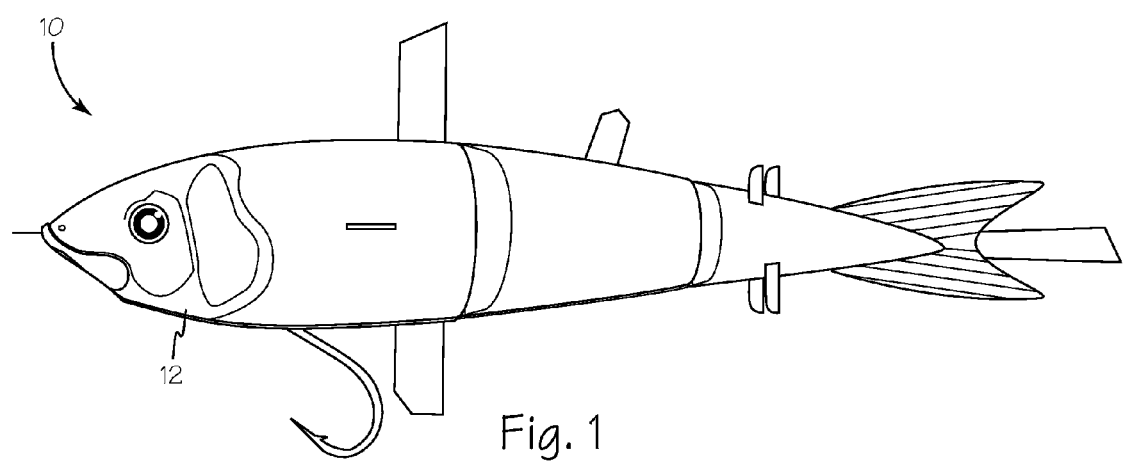
FIG. 1 is a side view of a multi-segment soft-bodied fishing lure with control planes inserted.

FIG. 1 illustrates lure or swim bait 10 with realistic and adjustable swimming performance generated by the interaction of the multi-segment, soft body 12 and the one or more clear and generally stiff control planes in each body segment.

Lure or swim bait 10 of FIGS. 2, 3, 4, 5, 6, 7 and 8 has a soft, multi-segmented body 12 having first, head or front segment 13, second or middle segment 14 and a third or tail segment 15 with a realistic tail 12T. One or more control planes are frictionally secured in each body segment such as segments 13, 14 or 15 with all the control planes generally coplanar with horizontal axis 23C. For example, first body segment 13 includes front vertical control plane 16 and front horizontal control plane 17. Control planes such as control planes 16 and 17 are generally stiff, clear plastic and may extend from one surface of body 12 or they may extend completely through the body as shown. Any suitable plastic may be selected for control planes, however they should be selected of a material that is generally invisible to fish in the water. Any suitable tool such as a narrow blade knife, razor blade or sharpened piece of plastic may be used to create a slot or opening to accommodate a control plane. The control planes are not sized, shaped or located to simulate the appearance of any natural appendages of any water creature.

Second or middle body segment 14 includes a middle, dorsal control plane 18 which generally extends from top or dorsal surface 12D of the body although any other suitable orientation may be used. Third or tail segment 15 includes first and second control planes 19 and 20 and collinear tail control plane 21 which is parallel to longitudinal axis 23C, and generally coplanar with vertical axis 23A and extends back, away from tail 12T. Horizontal orientation of tail control plane 21 in which the control plane is coplanar with horizontal axis 23C may also be used. Radial orientations of tail control plane 21 between vertical and horizontal may be used to generate swimming motions of a crippled baitfish.

Properly placed and aligned control planes such as planes 16, 17, 18, 19, 20 and 21 function to change the dynamic forces exerted on a swim bait by the water and the fishing line enabling the lure to achieve desirable, natural swimming motions. To generate natural swimming motions at a range of retrieve speeds as well as when sinking, a segmented, straight tailed, soft polymer or plastic swim bait needs one or more control surfaces to limit unnatural movement in its front and middle segment/sections(s) and one or more control surfaces to enhance and control the movement in its tail segment/section(s). The generally stiff and clear control planes such as planes 16, 17, 18, 19, 20 and 21 provide controlled force to the lure body whether the control plane ends are rounded, squared, diamond, rhombus shaped or even forked as illustrated. Rounded control planes such as control planes 19 and 20 are preferred because there is not a corner or sharp edge to cut or nick the line during the cast or retrieve and rounded control planes shed weeds best. Positioning of hook 5 and any suitable weight such as weight 2 in front segment 13 maintains a forward center of gravity to aid in stabilizing the entire lure.

Generally, control planes 16, 17, 18 limit back and forth, lateral head wobble, limit vertical roll, twist and rocking, and provide overall stability. Tail control surfaces 19 and 20, and protruding tail plane 21 controls movement to the tail segment/section and add stability. Often, additional tail movement stimulation is required due to the limiting of forces/movements by control planes 16, 17, 18 in the front and middle sections which tend to reduce desired tail movements. Tail control surfaces 19 and 20 are oriented at about 45 degrees from vertical and horizontal axes 23A and 23B respectively. Control planes such as control planes 16, 17, 18, 19, 20 and 21 may be oriented at any suitable angle relative to body axes 23A, 23B and 23C.

An angler may adjust or tune the performance of an individual lure or swim bait at the time of use to optimize the desired motions according to the existing water conditions. For example, small changes can be made to the positions of the control planes as well as the size and location of weights and hook placement and orientation that will enable the angler to fine-tune the lure to achieve the desired swimming motions. These fine adjustments can easily be made by adjusting the length of the control planes by pulling them out or pushing them in further into the body, or pushing them through farther to the opposite side of the bait.

For example, as placement of control planes 16, 17, 18 moves back toward the tail, the side-to-side motion/action/wobble/lateral arc of the front head portion of the swim bait become more limited. Additionally, control plane width 28 and length 30 of control plane 16 factor in limiting head movement, a wider and longer control plane 16 will limit movement more than a thin, short control plane. Extending the length of control plane 16 to protrude farther from bottom 12B of lure 10 will also limit head movement. Additionally, extending this control plane 16 to protrude from the bottom will limit vertical roll of body 12.

Control planes may be located in a range of positions within each segment of the lure body. Referring now to FIG. 3, range 34 is the range of positions available for control planes 16 and 17. Horizontal control plane 17 generally limits the roll/rocking or twist along horizontal axis 23C. A thin, generally short control plane is generally sufficient to accomplish this for most water conditions. The combined effect of the front vertical and front horizontal control planes, planes 16 and 17, is to create stabilization at a higher threshold retrieve speeds. Additionally, the combination provides stabilization when the swim bait is diving or coasting after a retrieve or troll is stopped. All motions discussed for lure 10 are based on retrieve force 6 applied through fishing line 1 along longitudinal axis 23C.

Range 36 is the range of suitable positions for control planes in the second or center segment of a swim bait or lure such as lure 10. Control plane 18 functions to limit the motions of the middle segment/section of the swim bait. Limiting movement in the middle section of the swim bait factors in limiting exaggerated head and tail movements when the lure is moving relative to the water. Control plane 18 also helps middle segment 14 stay aligned with front segment 13 and tail segment 15 which aids the baits speed and diving stabilization. Moving control plane 18 toward tail 12T has a limiting effect on the tail's motions as does increasing the width and length of control plane 18.

Range 37 is the range of suitable positions along horizontal axis 23C for control planes such as control planes 19 and 20 in third or tail segment 15 of a swim bait or lure such as lure 10. Control planes 19 and 20 are used together to create overall stability and control the movement in the tail section. Control planes 19 and 20 may be used in any suitable radial orientation about longitudinal axis 23C as illustrated by radial range 35 of FIG. 8. If control planes 19 and 20 are oriented in line with vertical and horizontal axes 23A and 23B, they hinder the ability of the lure to dive with its tail beating or appear to swim down when coasting or sinking at slow speed. When control planes 19 and 20 are aligned with the vertical and horizontal axes without a protruding tail control plane, the lure is very stable when sinking with very little movement in the tail section and provides subtle and subdued tail movements during a wide range of retrieve speeds. The addition of a protruding tail control plane provides the magnitude and direction of force necessary to make the lure appear to swim down when combined with the stabilizing vertical and horizontal tail control planes.

Protruding tail control plane 21 provides overall stability to the swim bait by increasing the overall lure length 38. Protruding tail control plane 21 also adds enough lateral resistance to allow tail 12T to move back and forth and simulate swimming, when the front sections of the lures movements are limited by the other control planes. Tail control plane 21 enables the natural motion of a moving tail when the retrieve is stopped and the swim bait is drifting or sinking. Adjusting the size, orientation and length of protrusion 39 provides a way for an angler to alter the tail beat frequency and arc. A longer protruding tail control plane slows the tail beat frequency and limits the lateral, side to side arc, more than a shorter and or narrower control plane. Orienting control plane 21 coplanar with horizontal axis 23B enables a slow tail beat at lower speed than when oriented coplanar with vertical axis 23A. In a horizontal orientation, control plane 21 enables swim bait 10 to glide horizontally with less vertical drop but, without the swim down action or motion.

Figure 9:
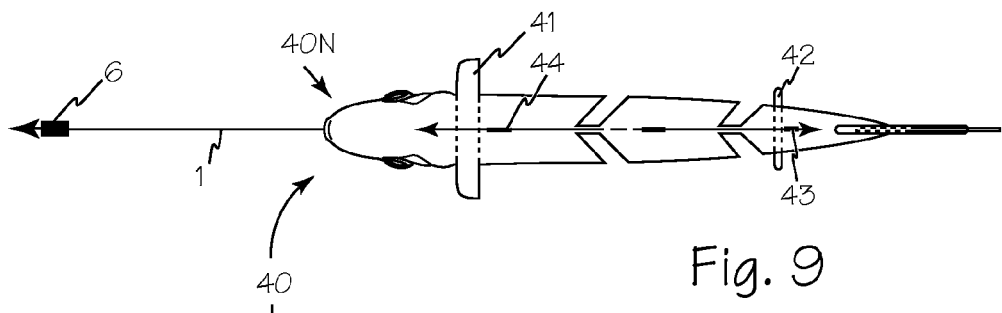
FIG. 9 is a top view of a fishing lure with control planes configured for jerkbaiting.
Figure 10:
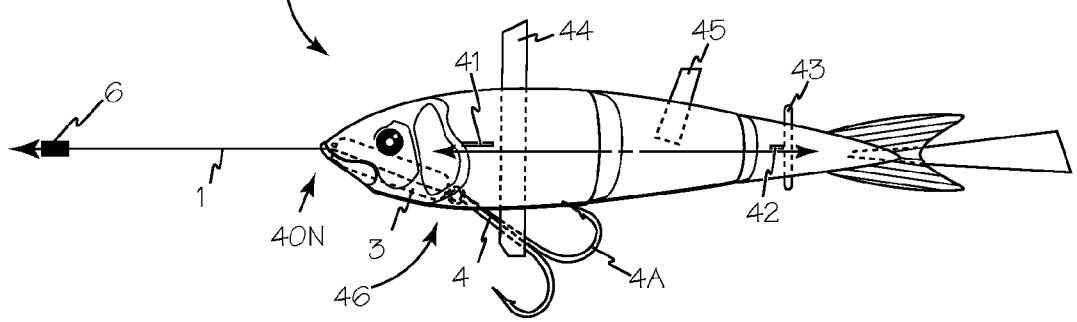
FIG. 10 is a side view of the fishing lure of FIG. 9.

Referring now to FIGS. 9 and 10, increasing the length and width of front horizontal control plane 41 of lure 40 will induce an increased horizontal glide but limit the lure's ability to swim straight down or dive under it's own weight. A more forward orientation of control plane 41 will also induce more of a glide and less overall stability at speed and dive. This motion may be enhanced by orienting control planes 42 and 43 parallel to front horizontal control plane 41 and front vertical control plane 44 respectively. A skilled and knowledgeable angler may recognize that the forward placement and increased size of the front horizontal control plane creates a desirable swim motion for an angling technique called "jerk baiting" (as it is commonly referred to by professional anglers and described in fishing journals). This technique involves a cadence of sharp pulls and pauses of a lure, (not continuous reeling or troll) in which the angler tries to mimic the motion of a wounded or struggling bait fish. When fished in this manner; front horizontal control plane 41 produces a wide, side to side darting action, with a relatively small amount of forward progress of the lure, both characteristics of a good jerkbait.

With front vertical control plane 44 and middle/dorsal control plane 45 positioned on the top side of lure 40, these control planes would extend above a hook located on the top of a swim bait, impeding the hooks ability to penetrate a fishes mouth. Also, a hook that comes out the top of the swim bait can impede the placement of front vertical control plane 44, therefore a bottom hook arrangement is preferred as illustrated in FIGS. 2 and 10.

Lures or swim baits 10, 40, 50, 60, 90 and 100 may be used without any weight or any suitable weight may be used, however, as illustrated in FIGS. 2 and 10, lures 10 and 40 use cylindrical or oblong shaped weights 2 and 3 respectively, with a pass through in its center for fishing line 1. This configuration lowers the center of gravity and provide keel weighting for added stabilization. Any suitable weight such as weight 3 is positioned within the nose 40N and angles down toward the tail generally extending from lure bottom 46. Any suitably sized weight or weights can be inserted into the lure body. After the weight is inserted, fishing line 1 is inserted through the front/nose of the lure through the weight and then any suitable hook, such as single hook 5 of FIG. 2, or a treble hook such as hook 4 of FIG. 10 is attached to line 1. One hook of a treble hook such as hook 4A can be inserted into the underbelly of the lure or permitted to dangle from lure bottom 46.

Figure 11:
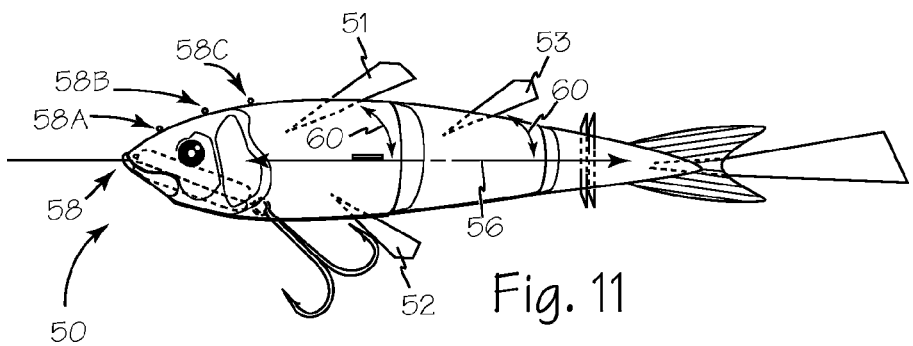
FIG. 11 is a side view of a fishing lure with control planes configured for high speed retrieves and trolling.
Figure 12:
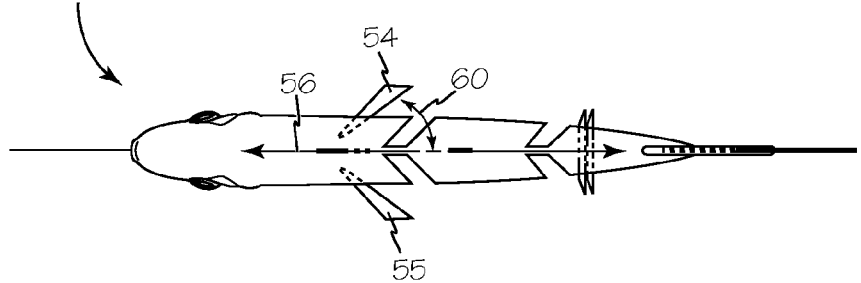
FIG. 12 is a top view of the fishing lure of FIG. 11.

There are a multitude of potential positions that differently sized and shaped control planes can be inserted in the body of a segmented, sectioned, straight tailed, soft plastic swim bait. Any control plane inserted into the body of a swim bait or lure changes the way that the bait moves through the water. Referring now to FIGS. 11 and 12, swim bait lure 50 is configured for high speed retrieves and trolling. At higher speeds drag and frictional forces applied on the control planes can make a lure unstable. Orienting control planes 51, 52, 53, 54 and 55 at angles such as angles 60 of less than 90° relative to longitudinal axis 56 of lure 50 improves the stability of the lure during high speed retrieves and trolling. A low angle orientation of control planes may also be used where larger control planes are used to dampen the effects of the large control planes. Additionally, the orientation of the line tie location will have an effect on the lure motion and will change the size and orientation of control planes required. For example, line tie location 58 necessitates the use front horizontal control planes such as control planes 17, 41, 54 and 55. For lures with tie locations higher on the lure top such as locations 58A and 58B, the size of the front horizontal control plane can be made smaller and for a line tie location such as 58C the front horizontal control plane may be omitted.

If the control planes are placed incorrectly or misaligned, they can generally be re-inserted into the body of a soft, plastic swim bait multiple times until placed to achieve the desired motion or action.

Two or more clear, generally invisible, adjustable plastic control planes may be added to any conventional soft bodied baits such as tube baits, worms, salamanders, crawfish and hollow bodied shad baits to control the motion of the lure when sinking, drifting or during active retrieves and may be used in an angling technique called "dropshotting."

Figure 13:
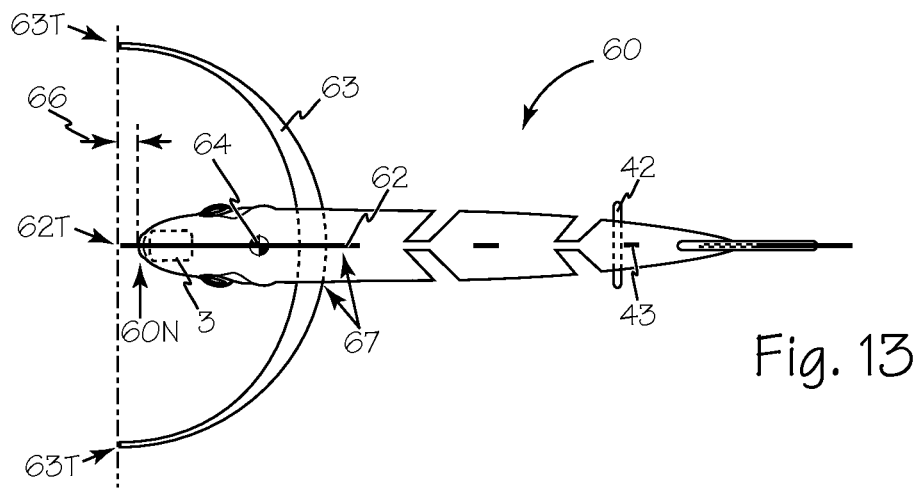
FIG. 13 is a top view of a fishing lure with extended control planes configured mimic feeding baitfish.
Figure 14:
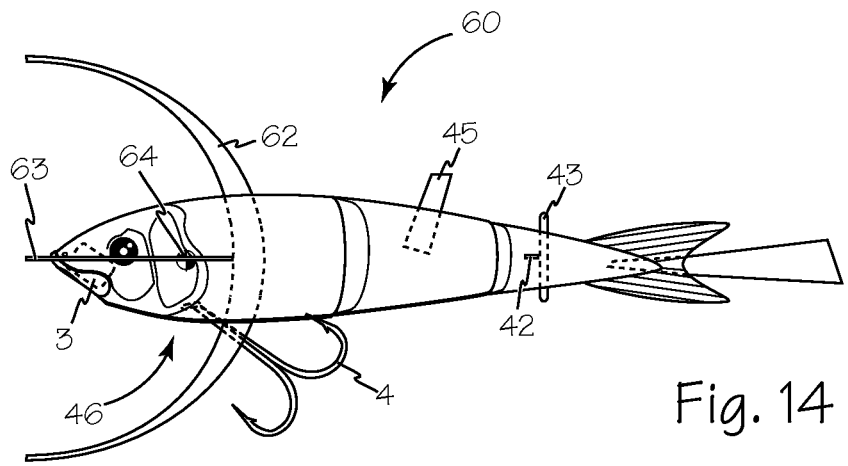
FIG. 14 is a side view of the fishing lure of FIG. 13.

Referring now to FIGS. 13 and 14, fishing lure 60 mimics the motions of feeding baitfish as lure 60 is allowed to sink along any suitable vertical structure. Lure 60 may also be twitched along the bottom in a nose down attitude, mimicking the feeding action of a baitfish on the bottom. Movement of lure 60 mimicking a feeding baitfish is produced by the combination of extended control planes 62 and 63 as well as having center of mass 64 forward of insertion points 67. One or more other control planes may also be used as discussed above.

Any suitable artificial lure body may be used as feeding baitfish lure 60. A suitable lure body has a tendency to glide forward due to the weighting, such as with the center of mass 64 near front or nose 60N. Extended control planes 62 and 63 act to restrict movement away from the vertical structure after initial contact, keeping the lure repeatedly gliding into the vertical structure. Suitable insertion positions for the extended control planes range from the nose to the tail, if the lure's movement is forward on a slack, tension free line.

Irregular features on the vertical structure interact with the flexibility of the extended control planes to bounce or push the sinking lure away. As long as the lure does not get bumped or pushed away from the vertical structure a greater distance than the length of the shortest of the extended control planes, the extended control planes re-engage the structure and continue to maintain the lure's descending, nose-in orientation Extended control planes 62 and 63 are inserted into lure 60 as discussed above and the extended control planes operate as discussed above with respect to vertical and horizontal control planes inserted in a wide range of positions within the lure body. Tips 62T and 63T of extended control planes 62 and 63 may also be oriented to extend beyond nose 60N of the lure body by any suitable offset distance such as distance 66. Offset distance 66 may be adjusted to accommodate rounded or irregular structures. With the relative orientation of the extended control plane insertion points 67 and a forward center of mass 64, any contact between tips 62T and 63T and fishing structure in the water will apply a corrective force to lure 60 and maintain nose 60N adjacent to the vertical structure.

When a feeding baitfish lure such as lure 60 is presented or fished along the bottom of a body of water, lure 60 is allowed to sink under the force of gravity. Owing to the control planes and or extended control planes in the lure, lure 60 will sink with a consistent nose-down orientation and slight movement of the tail. Upon contact between extended control plane tips 62T and 63T and the surface of the bottom, lure 60 will maintain a stable nose down attitude similar to a feeding baitfish with slight movements of the tail from vibrations and currents in the water. Any slight force applied to a fishing line attached to the lure will cause the lure to bounce slightly up from the bottom and move slightly across the bottom, again mimicking the feeding motion of a baitfish.

For the feeding baitfish configuration illustrated in FIGS. 13 and 14, the point of attachment of the fishing line and the hooks may have any suitable position.

Figure 15:
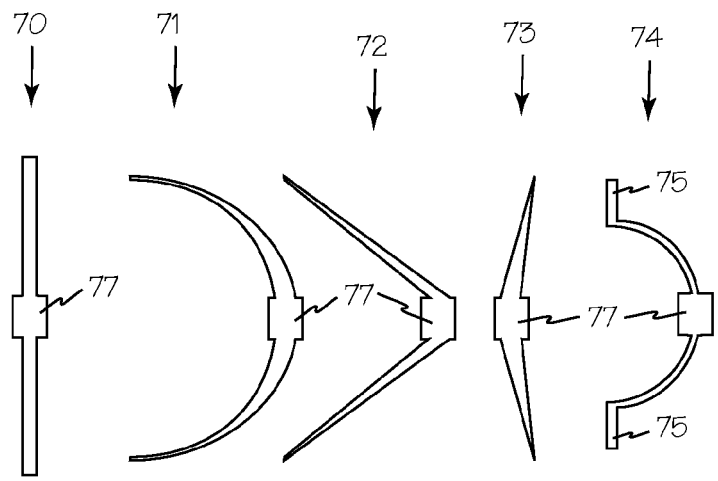
FIG. 15 is an illustration of extended control planes with a stabilizing component.
Figure 16:
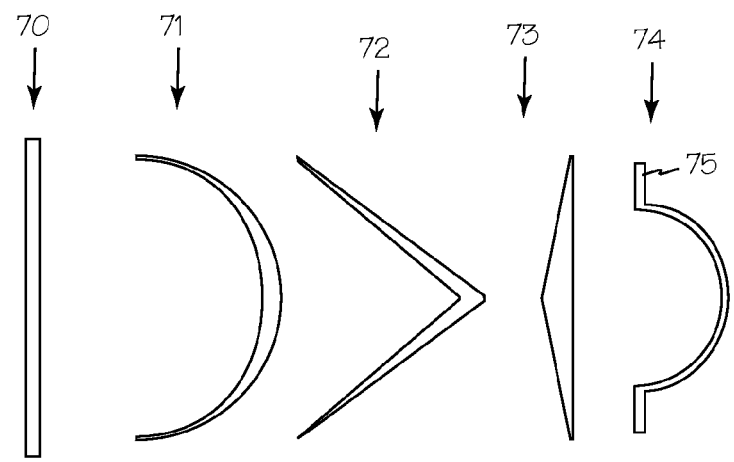
FIG. 16 is an illustration of extended control planes for insertion through the lure.
Figure 17:
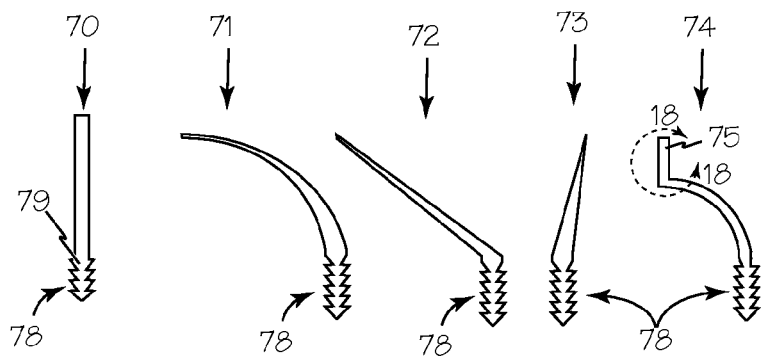
FIG. 17 is an illustration of extended control planes with barbed bases for insertion in the lure.

FIGS. 15, 16 and 17 illustrate several different extended control plane profiles in three different configurations. Straight profiles 70 are very similar to the vertical and horizontal control planes previously disclosed with a greater length. Curved profiles 71 are tapered to minimize weight, drag as well as minimize unnatural mouthfeel when swallowed by a feeding gamefish. Chevron profiles 72 may be used to maximize offset distance 66 while minimizing weight and drag. Tapered profiles 73 provide increased gliding force to the lure for use working under overhangs and dropping off ledges. Omega profiles 74 include feet 75 to maximize contact between an extended control plane and the structure the lure is working against.

All the profiles in FIG. 15 include a stability pad such as stability pads 77. The stability pad of each extended control plane is inserted into the lure body to prevent the extended control plane from rotating within the lure body when the lure encounters obstacles such a weeds and other debris in the water.

The extended control planes of FIG. 17 may be used in any suitable combination and each control plane includes retention barbs 78 on each insertion base such as insertion base 79. Each insertion base is pushed into the lure body to secure the extended control plane to the lure. Loss or destruction of a single extended control plane may be easily corrected and different combinations of extended control planes and different orientations of the control planes may be used. Any of the extended control planes of FIGS. 15, 16 and 17 may be used in any suitable combination to achieve an artificial lure that accurately mimics a feeding baitfish.

Figure 18:
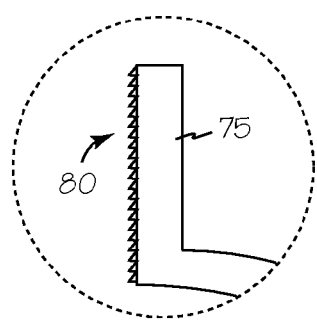
FIG. 18 is a close-up of the distal end of an extended control plane of FIG. 17 taken along 18-18.

Extended control plane foot 75 of FIG. 18 includes one or more fine structures such as teeth 80 to increase or control the amount of friction between the extended control plane and the structure the extended control plane is contacting during fishing. Any suitable structure such as teeth, bristles, hairs or other extensions may be used. Increasing friction between the extended control planes and any encountered structure slows the decent of the lure and improves position maintenance of the lure.

An alternative lure to simulate a feeding baitfish such as lure 90 of FIG. 19 may be cast or dropped onto or adjacent to structure 91 having a wet, vertical surface 92 and a wet or dry portion such as surface 93 which extends out of water 94. Lure 90 may be any suitable one-piece, soft bodied swim bait and includes vertical extended control plane 96 and horizontal extended control plane 97. Feeding baitfish lures such as lure 90 may include one or more hooks 98 attached in any suitable portion of the lure body as illustrated.

The length and stiffness of extended control planes must be balanced against the size, weight and composition of the lure body selected. When lure 90 is pulled over or is bounced against dry portion 93, extended control planes 96 and 97 operate with the mass of the lure and the center of mass to orient lure 90 upright with nose 90N as close to surface 92 as the extended control planes will permit. As lure 90 sinks along surface 92, extended control planes 96 and 97 operate to maintain the upright, nose-in orientation as illustrated.

In some circumstances, it may be useful to have either the vertical or horizontal extended control planes extending further that the other. For example, feeding baitfish lure 100 of FIGS. 20 and 21 is configures to optimize the feeding motion of the lure against round structures such a posts, pilings and submerged tree trunks such as piling 101. In this configuration, the tips of horizontal control plane 102 extend beyond the tips of vertical control plane 104. Distance 105 is selected to correspond to the diameter or other characteristic of the structure such as piling 101.

Figure 22:
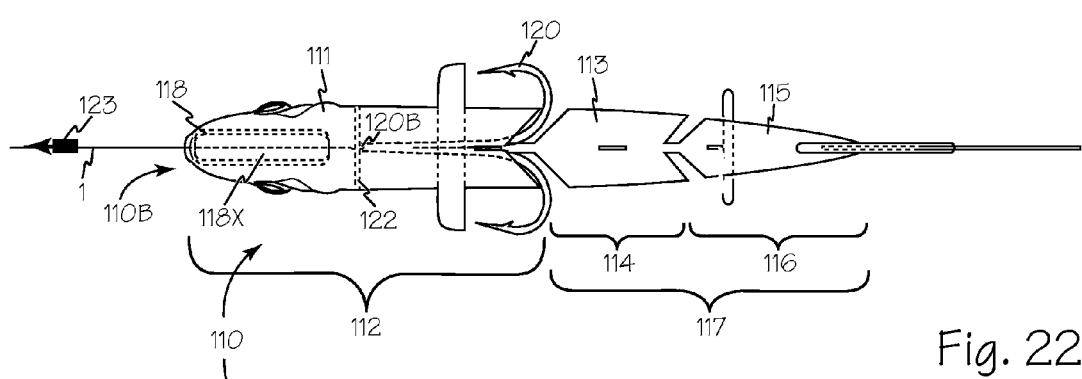
FIG. 22 is a top view of an alternate multi-segment soft-bodied fishing lure with control planes.
Figure 23:
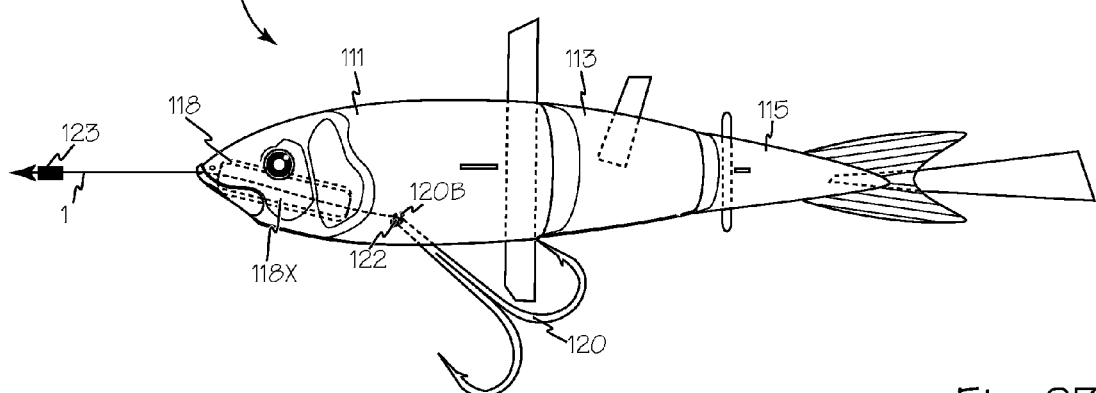
FIG. 23 is a side view of the feeding baitfish lure of FIG. 22.

Referring now to FIGS. 22 and 23, lure or swim bait 110 is configured with two or more body segments such as first or head segment 111 having a length 112 which is longer than any other segments such as second body segment 113 which has a length 114 or third or tail body segment 115 which has a length 116. Length 111 may also be approximately as long as length 117 which is the combined length of segments 113 and 115. Any of lures or swim baits 10, 40, 50, 60, 90, 100 or 110 may be used without any metal weight or weights being added to the lure. When being used without metal weight, a nose channel or tube such as tube 118 is inserted into body segment 111 to form a channel 118X for fishing line 1 through body segment 111. Fishing line 1 passes through tube 118 and is connected to any suitable hook such as hook 120. Tube 118 may be formed of any suitable lightweight material. Hook 120 is secured to lure 110 with a breakable or separable rib 122 which passes through eye 120B. If rib 122 is a breakable single piece it may be inserted through lure body 110B and through hook eye 120B to secure the hook to the lure body and provide a point at which retrieve force is applied to the lure by fishing line 1. Rib 122 may also be a breakable rib formed into lure body 110B. Rib 122 is sized and dimensioned to absorb retrieve force 123 and to break, separate or otherwise release hook 120 when the hook engages a gamefish.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. An artificial fishing lure comprising:
    a soft lure body having a lifelike profile and longitudinal, vertical and horizontal axes, the lure body comprising:
        a first body segment having a length;
        a second body segment having a length; and
        a tail segment having a length;
        wherein the first body segment length is greater than the second body segment length or the tail segment length;
    a first control plane removably secured through the first body segment, the first control plane oriented coplanar to the longitudinal axis and the vertical axis of the lure body;
    a second control plane removably secured through the first body segment, the second control plane oriented coplanar to the longitudinal axis and the horizontal axis of the lure body;
    a third control plane removably secured into the second body segment, the third control plane oriented coplanar to the longitudinal axis of the lure body and the vertical axis of the lure body;
    a fourth control plane removably secured through the tail segment, the fourth control plane oriented coplanar to the longitudinal and vertical axes of the lure body;
    a fifth control plane removably secured through the tail segment, the fifth control plane oriented coplanar to the longitudinal and horizontal axes of the lure body;
    a protruding control plane removably secured into the tail segment, the protruding control plane oriented along and coplanar to the longitudinal axis of the lure body; and
    a rib for securing a fishing hook in the first body segment.

2. The artificial lure of claim 1 further comprising a tube inserted in the first body segment to form a channel for a fishing line.

3. The artificial lure of claim 2 wherein the tube is formed of metal to weight the lure.

4. The artificial lure of claim 2 wherein the tube is formed of lightweight material.

5. The artificial lure of claim 1 wherein the rib is breakable.

6. The artificial lure of claim 1 wherein the rib is separable and formed as part of the first body segment.

7. The artificial lure of claim 1 wherein the first and second control planes are extended control planes.

8. The artificial lure of claim 1 wherein the length of the first body segment is approximately equal to the combined lengths of the second and tail segments.

* * * * *